United States Patent [19]

Van Neste et al.

[11] Patent Number: 4,851,145

[45] Date of Patent: Jul. 25, 1989

[54] CORROSION-INHIBITED ANTIFREEZE/COOLANT COMPOSITION

[75] Inventors: Walter A. Van Neste, Amandsberg; Jean P. Maes, Merelbeke; Rita Vereecken, Sint Niklaas, all of Belgium

[73] Assignee: S.A. Texaco Petroleum NV, Brussels, Belgium

[21] Appl. No.: 880,473

[22] Filed: Jun. 30, 1986

[51] Int. Cl.$^4$ ................................................ C09K 5/00
[52] U.S. Cl. .............................. 252/75; 252/76; 252/77; 252/389.2; 252/396; 422/6; 422/16; 422/17
[58] Field of Search .............. 252/75, 76, 77, 389.2, 252/396; 422/6, 16, 17

[56] References Cited

U.S. PATENT DOCUMENTS

| | | | |
|---|---|---|---|
| 2,832,742 | 4/1958 | Weltman | 252/77 |
| 4,342,596 | 8/1982 | Conner, Sr. | 106/14.27 |
| 4,382,008 | 5/1983 | Boreland et al. | 252/76 |
| 4,561,990 | 12/1985 | Darden | 252/76 |
| 4,587,028 | 5/1986 | Darden | 252/75 |
| 4,588,513 | 5/1986 | Triebel et al. | 252/76 |

FOREIGN PATENT DOCUMENTS 130478  10/1981  Japan .................................. 422/16

*Primary Examiner*—Robert A. Wax

*Attorney, Agent, or Firm*—Robert A. Kulason; Robert B. Burns; James J. O'Loughlin

[57] ABSTRACT

A corrosion inhibitor for use in aqueous and liquid alcohol compositions is described comprising the combination of:

(a) an alkylbenzoic acid or the alkali metal, ammonium, or amine salt thereof, said acid having the general formula

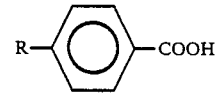

where R is a $C_1$–$C_5$ alkyl radical;

(b) a $C_8$–$C_{12}$ aliphatic monobasic acid or the alkali metal, ammonium, or amine salt thereof; and (c) a hydrocarbyl triazole.

Aqueous compositions containing the above-described corrosion inhibitor as well as antifreeze/coolant concentrate and aqueous antifreeze/coolant compositions containing said corrosion inhibitor are also described. The corrosion-inhibitor of the instant invention gives synergistic corrosion protection to metal surfaces as compared with compositions containing either the alkylbenzoic or aliphatic monobasic acid component alone.

14 Claims, No Drawings

CORROSION-INHIBITED ANTIFREEZE/COOLANT COMPOSITION

BACKGROUND OF THE INVENTION

1. Field of the Invention

This invention relates to a metal corrosion inhibitor for use in aqueous solutions, and to antifreeze/coolant compositions containing such a corrosion inhibitor. More particularly, this invention relates to a corrosion inhibitor comprising a combination of alkylbenzoic and aliphatic monobasic acids and/or the alkali metal, ammonium, or amine salts of such acids, and to corrosion-inhibited aqueous and antifreeze/coolant compositions containing the same.

Automobile engine cooling systems contain a variety of metals, including copper, solder, brass, steel, cast iron, aluminium, magnesium, and their alloys. The possibility of corrosive attack on such metals is high, due to the presence of various ions as well as the high temperatures, pressures, and flow rates found in such cooling systems. The presence of corrosion products within the cooling system can interfere with heat transfer from the engine combustion chambers, which may subsequently cause engine overheating and engine component failure due to excess metal temperatures. See generally Fay, R. H., "Antifreezes and Deicing Fluids," *In: Kirk-Othmer Encyclopedia of Chemical Technology* (1978) ed.), vol. 3, pp. 79–95. It would therefore be generally advantageous if the formation of corrosion products within automobile cooling systems could be controlled or eliminated. It is one object of the instant invention to provide a corrosion inhibitor useful in the prevention and control of corrosion in automobile engine cooling system containing various metals.

The trend towards improved fuel economy for automobiles has led to the increased use of lightweight materials such as aluminum and magnesium alloys for engine and cooling system components. However, it has been found that pitting and crevice corrosion are particularly prevalent in aluminum-containing cooling systems. Pitting of thin-walled automobile radiator tubes may lead to tube perforation; crevice corrosion at cylinder head packings or coolant hose connections may also occur. Both types of corrosion may lead to eventual coolant loss, with subsequent engine overheating and component failure. Other forms of localized corrosion such as deposit attack from deposition of corrosion products may also result.

Many conventional corrosion inhibitor additives used in automobile cooling systems do not provide adequate protection against the pitting, crevice, and deposit attack corrosion phenomena found with aluminum and various other metal alloys. It would therefore be particularly advantageous if such localized corrosion phenomena could be controlled or eliminated. It is another object of the instant invention to provide a corrosion inhibitor for use in automobile cooling systems which prevents or controls localized corrosion of aluminum, magnesium, and various other metal surfaces.

All corrosion inhibitors employed in automobile antifreeze/coolant formulations are gradually depleted by use and the build-up of corrosion products in the cooling system. It would thus be advantageous if the build-up of corrosion products within the system and subsequent corrosion inhibitor depletion or degradation could be controlled or eliminated. It is a further object of the instant invention to provide a corrosion inhibitor which is less prone to depletion or degradation than traditional corrosion inhibitors used in antifreeze/coolant formulations.

2. Information Disclosure Statement

It is well known that various monobasic and dibasic acids as well as the salts of such acids are effected as corrosion inhibitors when employed in antifreeze/coolant formulations. For example:

U.S. patent application Ser. No. 813,902, filed on Dec. 27, 1985 (incorporated herein by reference) describes various U.S. and foreign references which disclose the use of basic acids/salts as corrosion inhibitors in antifreeze/coolant formulations, and also discloses a corrosion inhibitor which comprises the combination of a $C_5$–$C_{16}$ aliphatic monobasic acid/salt, a $C_5$–$C_{16}$ hydrocarbyl dibasic acid/salt, and a hydrocarbyl triazole for use in engine antifreeze/coolant systems;

U.S. patent application Ser. No. 819,321, filed on Jan. 16, 1986 discloses a stabilized corrosion-inhibited antifreeze/coolant formulation which comprises at least one $C_5$–$C_{16}$ monobasic or dibasic acid/salt and a precipitation-inhibiting hydrocarbyl aminophosphonic acid/salt or polyacrylic acid/polyacrylate stabilizer; and U.S. patent application Ser. No. 847,076, filed Apr. 1, 1986 discloses a corrosion-inhibited antifreeze composition comprising a $C_5$–$C_{16}$ aliphatic monobasic acid/salt, a $C_5$–$C_{16}$ hydrocarbyl dibasic acid/salt, a hydrocarbyl azole, and a hydrocarbyl $C_{10}$–$C_{20}$ alkali metal sulfonate.

The general use of alkylbenzoic acids/salts as corrosion inhibitors is also well known. For example, U.S. Pat. Nos. 4,501,667, 4,402,907, and 4,366,076 disclose that alkylbenzoic acids such as 4-tert-butylbenzoic acid are useful as metal corrosion inhibitors. In addition:

U.S. Pat. No. 4,552,678 discloses a corrosion inhibitor obtained from the reaction product of a polyamine, an anhydride, and an organic acid of the formula $R_2$—COOH where $R_2$ may be H, a $C_1$–$C_{12}$ alkyl $C_1$–$C_5$ hydroxyalkyl, phenyl, tert-butyl, phenyl, or styryl radical;

U.S. Pat. No. 3,769,214 discloses an aqueous lubricant composition containing a minor amount of a metal anti-staining agent and stability improver which is an alkanolamine salt of a carboxylic acid having at least 12 carbon atoms per molecule;

U.S. Pat. No. 2,832,742 discloses the use of a blend of the diethanol amine salts of p-tert-butylbenzoic acid and a high molecular weight $C_7$–$C_{18}$ aliphatic carboxylic acid mixture derived from an oxidized petroleum fraction;

Japanese Pat. No. 59208082 discloses a method of inhibiting corrosion in a cooling water system for an internal combustion engine via addition of a corrosion inhibitor containing a water soluble amine salt of benzotriazole, a water soluble amine salt of t-butylbenzoic acid, a nitrite, and a benzoate to the cooling water; and API Primary Petroleum Products Abstract No. 76-20709 describes French Pat. No. 2268791, which discloses a water soluble ferrous metal corrosion inhibitor which is the condensation product of a $C_1$–$C_6$ para-alkylbenzoic acid and an alkanolamine.

SUMMARY OF THE INVENTION

The instant invention is directed to a novel corrosion inhibitor for use in aqueous systems, a corrosion-inhibited aqueous composition comprising said corrosion inhibitor, and corrosion-inhibited antifreeze/coolant formulations comprising said corrosion inhibitor.

The novel corrosion inhibitor of the instant invention comprises:
(a) an alkylbenzoic acid or the alkali metal, ammonium, or amine salt thereof, said acid having the general formula

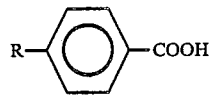

where R is a $C_1$–$C_5$ alkyl radical;
(b) a $C_8$–$C_{12}$ aliphatic monobasic acid or the alkali metal, ammonium, or amine salt thereof; and
(c) a hydrocarbyl triazole.

The most preferred corrosion inhibitor of the instant invention comprises: the alkylbenzoic acid 4-tert-butylbenzoic acid, or the alkali metal, ammonium, or amine salt thereof; the aliphatic monobasic acid octanoic acid or 2-ethylhexanoic acid or the alkali metal, ammonium, or amine salts thereof; and the hydrocarbyl aromatic triazole tolyltriazole.

Additional corrosion inhibitors which may be employed in admixture with the novel corrosion inhibitor of the instant invention include: corrosion inhibitors selected from the group consisting of alkali metal borates, alkali metal silicates, alkali metal benzoates, alkali metal nitrates, alkali metal nitrites, alkali metal molybdates, and hydrocarbyl thiazoles; and $C_8$–$C_{12}$ aliphatic dibasic acids, or the alkali metal, ammonium, or amine salts thereof, preferably sebacic acid or the alkali metal, ammonium, or amine salt thereof.

Aqueous compositions containing said corrosion inhibitor as well as liquid alcohol based antifreeze/coolant formulations containing said corrosion inhibitor are also described. Compositions containing the corrosion inhibitor of the instant invention exhibit a synergistic resistance to corrosion in comparison with compositions containing either the alkylbenzoic or aliphatic monobasic acid/salt component above.

DETAILED EMBODIMENTS OF THE INVENTION

The novel corrosion inhibitor of the instant invention comprises the combination of an alkylbenzoic acid and aliphatic monobasic acid and/or the alkali metal ammonium, or amine salts of such acids, together with a hydrocarbyl triazole, for use in aqueous systems and in antifreeze/coolant concentrate and aqueous antifreeze/coolant formulations.

The alkylbenzoic acid component of the corrosion inhibitor is of the general formula

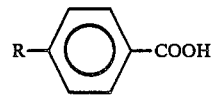

where R is a $C_1$–$C_5$ alkyl radical. 4-tert-butylbenzoic acid (hereinafter referred to as PTBBA) is the most preferred alkylbenzoic acid for use in the instant invention. Alkali metal, ammonium, or amine salts of the alkylbenzoic acid may also be employed. Any alkali metal, ammonium, or amine may be used to form the alkylbenzoic acid salt; however, alkali metals are preferred. The most preferred alkali metals for use are sodium and potassium.

The aliphatic monobasic acid component of the corrosion inhibitor may be any $C_8$–$C_{12}$ aliphatic monobasic acid or the alkali metal, ammonium, or amine salt of said acid. This would include one or more of the following acids or isomers thereof: octanoic, nonanoic, decanoic, undecanoic, dodecanoic, and 2-ethylhexanoic and mixtures thereof. Octanoic acid (hereinafter referred to as OA) and 2-ethylhexanoic acid (hereinafter referred to as EHA) are particularly preferred. Any alkali metal, ammonium, or amine can be used to form the monobasic acid salt; however, alkali metals are preferred. Sodium and potassium are the preferred alkali metals for use in forming the monobasic acid salt.

The hydrocarbyl triazole component of the corrosion inhibitor of the instant invention is preferably an aromatic triazole or alkyl-substituted aromatic triazole such as benzotriazole or tolytriazole. The most preferred hydrocarbyl triazole for use in tolyltriazole (hereinafter referred to as TTZ).

One or more conventional corrosion inhibitors may also be employed in admixture with the novel corrosion inhibitor of the instant invention. Such conventional corrosion inhibitors may be selected from the group comprising: alkali metal borates, alkali metal silicates, alkali metal benzoates, alkali metal nitrates, alkali metal nitrites, alkali metal molybdates, and hydrocarbyl thiazoles.

An additional corrosion inhibitor which may optionally be employed in admixture with the corrosion inhibitor of the instant invention is a $C_8$–$C_{12}$ aliphatic dibasic acid or the alkali metal, ammonium, or amine salt of said acid. This would include one or more of the following acids: suberic, azelaic, sebacic, undecanedioic, dodecanedioic, the diacid of dicyclopentadiene (hereinafter referred to as DCPDDA), terephthalic and mixtures thereof. Sebacic acid (hereinafter referred to as SA) is particularly preferred. Any alkali metal, ammonium, or amine may be used to form the dibasic acid salt; however, alkali metals are preferred. Sodium and potassium are the preferred alkali metals for use in forming the dibasic acid salt.

The corrosion inhibitor of the instant invention will most typically be employed in antifreeze formulations as coolants for internal combustion engines. Other applications may include hydraulic fluids, aqueous cutting oils, paints, soluble oils, metal cutting fluids, aircraft deicers, and greases. In these applications, the monobasic and dibasic acid salts may be formed with metal hydroxides including sodium, potassium, lithium, barium, calcium, and magnesium.

In one embodiment of the instant invention, the above-described corrosion-inhibitor is employed in admixture with water to form a corrosion-inhibited aqueous composition. The aqueous composition comprises: a major amount of water; from 0.1–15.0, preferably 0.1–5.0 weight percent of the above-described alkylbenzoic acid/salt corrosion inhibitor component, preferably PTBBA; from 0.1–15.0, preferably 0.1–5.0 weight percent of the above-described aliphatic monobasic acid/salt corrosion inhibitor, preferably OA or EHA; and from 0.1–0.5, preferably 0.1–0.3 weight percent of the above-described hydrocarbyl triazole component, preferably TTZ.

In a preferred embodiment of the instant invention, the above-described corrosion inhibitor is employed in admixture with a liquid alcohol freezing point depressant to form a novel antifreeze/coolant concentrate composition for use in the cooling systems of internal combustion engines. The antifreeze/coolant concentrate composition comprises: from 80–99, preferably 90–99 weight percent of a water soluble liquid alcohol freezing point depressant; from 0.1–15.0, preferably 0.1–5.0 weight percent of the above-described alkylbenzoic acid/salt corrosion inhibitor component, preferably PTBBA; from 0.1–15.0, preferably 0.1–5.0 weight percent of the above-described aliphatic monobasic acid/salt corrosion inhibitor component, preferably OA or EHA; and from 0.1–0.5, preferably 0.1–0.3 weight percent of the above-described hydrocarbyl triazole component, preferably TTZ.

The liquid alcohol freezing point depressant component of the above-described antifreeze/coolant concentrate composition may be a glycol or glycol ether. The glycol ethers which may be employed as major components in the instant invention include glycols such as ethylene glycol, diethylene glycol, propylene glycol, dipropylene glycol, and glycol monoethers such as the methyl, ethyl, propyl, and butyl ethers of ethylene glycol, diethylene glycol, propylene glycol, and dipropylene glycol. Ethylene glycol is particularly preferred as the liquid alcohol freezing point depressant component.

In the above-described antifreeze/coolant concentrate composition of the instant invention, an additional aliphatic dibasic acid/salt corrosion inhibitor, preferably SA, may be employed at concentrations of 0.1–5.0 weight percent. Additional conventional corrosion inhibitors such as alkali metal borates, silicates, benzoates, nitrates, nitrites, molybdates, or hydrocarbyl thiazoles may also be employed at concentrations of 0.01–5.0 weight percent.

In another embodiment of the instant invention, the above-described corrosion-inhibited antifreeze/coolant concentrate composition is diluted with 10–90 volume percent, preferably 25–75 volume percent of water.

The method of the invention will be further illustrated by the following examples, which are not intended to limit the invention, but rather to illuminate it.

EXAMPLE 1

(Comparative Example)

A borax-benzoate type antifreeze formulation was prepared comprising a major amount of ethylene glycol, 3.0 weight percent sodium benzoate, 1.0 weight percent borax, 0.2 weight percent sodium metasilicate pentahydrate, 0.2 weight percent sodium nitrate, 0.1 weight percent sodium nitrite, and 0.2 weight percent TTZ.

EXAMPLE 2

(Comparative Example)

An antifreeze formulation was prepared comprising a major amount of ethylene glycol, 3.5 weight percent SA, and 0.2 weight percent TTZ.

EXAMPLE 3

(Comparative Example)

An antifreeze formulation was prepared comprising a major amount of ethylene glycol, 1.75–2.0 weight percent OA, 1.75 weight percent SA, and 0.2 weight percent TTZ.

EXAMPLE 4

(Comparative Example)

An antifreeze formulation was prepared comprising a major amount of ethylene glycol, 3.0 weight percent PTBBA, and 0.2 weight percent TTZ.

EXAMPLE 5

An antifreeze formulation was prepared comprising a major amount of ethylene glycol, 0.5 weight percent OA, 2.5 weight percent PTBBA, and 0.2 weight percent TTZ.

EXAMPLE 6

An antifreeze formulation was prepared comprising a major amount of ethylene glycol, 1.0 weight percent OA, 2.0 weight percent PTBBA, and 0.2 weight percent TTZ.

EXAMPLE 7

An antifreeze formulation was prepared comprising a major amount of ethylene glycol, 1.5 weight percent OA, 1.5 weight percent PTBBA, and 0.2 weight percent TTZ.

EXAMPLE 8

An antifreeze formulation was prepared comprising a major amount of ethylene glycol, 2.0 weight percent OA, 1.0 weight percent PTBBA, and 0.2 weight percent TTZ.

EXAMPLE 9

An antifreeze formulation was prepared comprising a major amount of ethylene glycol, 2.5 weight percent OA, 0.5 weight percent PTBBA, and 0.2 weight percent TTZ.

EXAMPLE 10

An antifreeze formulation was prepared comprising a major amount of ethylene glycol, 1.5 weight percent OA, 1.5 weight percent PTBBA, 1.3 weight percent borax, and 0.2 weight percent TTZ.

EXAMPLE 11

An antifreeze formulation was prepared comprising a major amount of ethylene glycol, 1.5 weight percent OA, 1.5 weight percent PTBBA, 0.1 weight percent sodium metasilicate pentahydrate, and 0.2 weight percent TTZ.

EXAMPLE 12

An antifreeze formulation was prepared comprising a major amount of ethylene glycol, 2.0 weight percent OA, 0.5 weight percent PTBBA, 0.5 weight percent SA, and 0.2 weight percent TTZ.

EXAMPLE 13

An Antifreeze formulation was prepared comprising a major amount of ethylene glycol, 2.0 weight percent EHA, 1.5 weight percent PTBBA, and 0.2 weight percent TTZ.

EXAMPLE 14

An antifreeze formulation was prepared comprising a major amount of ethylene glycol, 2.0 weight percent EHA, 0.5 weight percent PTBBA, 1.5 weight borax, 0.1 weight percent sodium metasilicate pentahydrate, and 0.2 weight percent TTZ.

EXAMPLE 15

An antifreeze formulation was prepared comprising a major amount of ethylene glycol, 2.0 weight percent EHA, 0.5 weight percent PTBBA, 1.5 weight percent borax, 0.1 weight percent sodium metasilicate pentahydrate, 0.1 weight percent sodium nitrate, and 0.2 weight percent TTZ.

EXAMPLE 16

An antifreeze formulation was prepared comprising a major amount of ethylene glycol, 2.0 weight percent EHA, 0.5 weight percent PTBBA, 1.5 weight percent borax, 0.1 weight percent sodium metasilicate pentahydrate, 0.1 weight percent sodium nitrite, and 0.2 weight percent TTZ.

It is well known that the corrosion resistance of a metal or alloy depends upon both the stability of its passivating oxide protective film and its ability to repassivate active corrosion regions on the surface of the metal or alloy. A Rapid Cyclic Potentiokinetic Polarization Scanning (RCP) technique, based on cyclic potentiokinetic polarization and described in the CE-BELCOR (Centre Belge d'Etude de la Corrosion) publication *Rapports Techniques,* Vol. 147, R. T. 272 (Aug. 1984), may be used to determine the susceptibility of a metal or alloy to localized corrosion. The RCP technique measures both rupture or pitting potential ($E_R$) and repassivation potential ($E_P$) for a given metal or alloy. $E_R$ is the potential at which the passivating film of a given material breaks down, aand is directly related to the pitting tendency of the material in a particular environment. $E_P$ is the potential at which active corrosion regions of the material are repassivated in a given environment. $E_R$ and $E_P$ values are measured with a silver reference electrode and a working electrode constructed from the material subject to corrosive attack. The higher (more positive) the $E_R$ value, the more effective a given antifreeze formulation is in preventing pitting corrosion initiation and progress. Similarly, a higher (more positive) $E_P$ value indicates that the particular corrosion inhibitor formulation has a greater ability to repassivate existing pits and crevices.

The RCP test procedure may be described as follows: polished specimens of the metal to be tested (working electrode) are immersed in a 30% by volume solution of a given antifreeze concentrate formulation in hard ASTM corrosive water; that is, water containing 148 mg/l of sodium sulfate, 165 mg/l of sodium chloride, 138 mg/l of sodium bicarbonate (ASTM D1384 corrosive water), and in addition 275 mg/l of calcium chloride.

Polarization is achieved by polarizing at a scan rate of 2 mv/second until the rupture potential $E_R$ is attained. A rapid increase in polarizing current results at $E_R$ as the protective passivating film breaks down. When the current reaches a predetermined maximum value, the scanning direction is reversed towards more cathodic potentials. The repassivation potential $E_P$ is determined during this final phase of the RCP scan.

Table I sets forth $E_R$ and $E_P$ values obtained via the RCP technique for Examples 1, 2, 3 and 7. Electrode potentials are shown for various metals for a borax-benzoate type corrosion inhibitor (Example 1), a dibasic acid corrosion inhibitor (Example 2), a monobasic-dibasic acid corrosion inhibitor (Example 3), and a corrosion inhibitor of the instant invention (Example 7). Significantly improved corrosion protection against pitting and crevice corrosion is shown, particularly for aluminum, magnesium, and lead. In addition, levels of copper, solder and steel protection are reached by the instant invention which are equal to those of dibasic or monobasic-dibasic inhibitors.

The synergism in corrosion protection for the various metals in coolant solutions according to the instant invention is shown in Table II. $E_R$ and $E_P$ values obtained via the RCP technique for Examples 4, 5, 6, 7, 8, and 9 are shown for various metals in coolant solutions containing different amounts of PTBBA and OA.

Further improved corrosion protection for various metals is illustrated in Table III showing $E_R$ and $E_P$ values in coolant solutions containing PTBBA and OA, with additional amounts of borax (Example 10), sodium silicate (Example 11), and in coolants containing OA, PTBBA, & SA (Example 12), and EHA & PTBBA (Example 13).

The corrosion behavior of several of the formulations of the instant invention as well as comparative examples were tested according to the ASTM D-1384 Glassware Corrosion Test, incorporated herein by reference. Table IV sets forth the results obtained. The smaller the weight loss of the metal coupon, the greater the corrosion inhibiting properties of a particular formulation. A negative weight loss signifies a weight increase due to the formation of a protective coating on the coupon. As illustrated by Table IV, the antifreeze formulations of the instant invention (Examples 7, 12-16) provide corrosion protection for the metals tested comparable to that of the comparative examples tested (Examples 1-3).

TABLE I

| | RCP MEASUREMENTS TO DETERMINE CORROSION INHIBITOR EFFECTIVENESS ($E_R$ AND $E_P$ IN mv). | | | | | | | | | | | |
|---|---|---|---|---|---|---|---|---|---|---|---|---|
| | WORKING ELECTRODE | | | | | | | | | | | |
| | ALUMINUM | | COPPER | | SOLDER | | STEEL | | MAGNESIUM | | LEAD | |
| EXAMPLE | $E_R$ | $E_P$ | $E_R$ | $E_P$ | $E_R$ | $E_P$ | $E_R$ | $E_P$ | $E_R$ | $E_P$ | $E_R$ | $E_P$ |
| 1 | 300 | −400 | 750 | 100 | 200 | −250 | 600 | −500 | −1700 | −1650 | 1000 | 800 |
| 2 | 350 | −600 | 1800 | 3000 | 1150 | 1100 | 650 | 620 | −1500 | −1400 | 1250 | 1100 |
| 3 | 720 | −580 | 1850 | 1600 | 1200 | 1150 | 740 | 720 | 400 | * | 1100 | 1000 |
| 7 | >2400 | * | 1680 | 1500 | 1200 | 900 | 640 | 600 | >2000 | >2000 | 1450 | 2500 |

*Repassivation potential $E_P$ could not be determined.

TABLE II

| | RCP MEASUREMENTS DEMONSTRATING THE SYNERGISTIC EFFECT OF THE INSTANT INVENTION | | | | | | | |
|---|---|---|---|---|---|---|---|---|
| | WORKING ELECTRODE | | | | | | | |
| EXAM- | ALUMINUM | | COPPER | | SOLDER | | STEEL | |
| PLE | $E_R$ | $E_P$ | $E_R$ | $E_P$ | $E_R$ | $E_P$ | $E_R$ | $E_P$ |
| 4 | 1700 | 0 | 1900 | 320 | 1400 | 150 | 1150 | 1250 |
| 5 | 2300 | 100 | 1880 | 100 | 1450 | 1600 | 760 | 1200 |
| 6 | >2400 | * | 2100 | 100 | 1600 | 1800 | 740 | 720 |

TABLE II-continued
RCP MEASUREMENTS DEMONSTRATING THE SYNERGISTIC EFFECT OF THE INSTANT INVENTION

| EXAMPLE | WORKING ELECTRODE | | | | | | | |
|---|---|---|---|---|---|---|---|---|
| | ALUMINUM | | COPPER | | SOLDER | | STEEL | |
| | $E_R$ | $E_P$ | $E_R$ | $E_P$ | $E_R$ | $E_P$ | $E_R$ | $E_P$ |
| 7 | >2400 | * | 1680 | 1500 | 1200 | 900 | 640 | 600 |
| 8 | >2400 | 510 | 1600 | 1500 | 1260 | 980 | 700 | 650 |
| 9 | >2400 | 1400 | 1540 | 100 | 1200 | 900 | 700 | 680 |

*Repassivation potential $E_P$ could not be determined.

TABLE III
RCP MEASUREMENTS DEMONSTRATING THE EFFECTIVENESS OF DIFFERENT COMBINATIONS OF THE CORROSION INHIBITOR OF THE INSTANT INVENTION

| Example | WORKING ELECTRODE | | | | | | | |
|---|---|---|---|---|---|---|---|---|
| | ALUMINUM | | COPPER | | SOLDER | | STEEL | |
| PLE | $E_R$ | $E_P$ | $E_R$ | $E_P$ | $E_R$ | $E_P$ | $E_R$ | $E_P$ |
| 10 | >2400 | * | 2000 | >2400 | 1400 | 1450 | 750 | 740 |
| 11 | 2350 | 1500 | 1200 | 220 | 1400 | 1500 | 740 | 760 |
| 12 | >2400 | 1100 | 1980 | 1830 | 1400 | 1150 | 700 | 670 |
| 13 | 2350 | 950 | 2125 | 950 | 1400 | 1000 | 700 | 700 |

Repassivation potential $E_P$ could not be determined.

TABLE IV
RESULTS OF ASTM D1384 GLASSWARE CORROSION TESTS

| EXAMPLE | GLASSWARE CORROSION TEST (weight loss, mg/coupon) | | | | | |
|---|---|---|---|---|---|---|
| | Copper | Solder | Brass | Steel | Iron | Aluminum |
| 1 | 1.7 | 4.6 | 1.0 | 2.2 | 6.2 | −0.8 |
| 2 | 1.1 | 1.2 | 0.2 | 1.1 | 0.4 | 6.6 |
| 3 | 1.2 | 1.7 | 1.4 | 1.4 | 0.7 | −0.3 |
| 7 | 1.6 | 1.3 | 1.6 | −0.3 | −0.3 | 0.3 |
| 12 | 2.2 | 2.8 | 1.5 | 0 | 2.7 | 3.2 |
| 13 | 2.5 | 2.7 | 1.8 | 0.2 | 1.8 | 2.6 |
| 14 | 1.2 | 0.9 | −1.1 | −0.1 | 1.6 | 2.0 |
| 15 | 0.4 | 1.4 | 0.8 | 0.3 | 2.4 | 2.5 |
| 16 | 0.8 | 1.5 | 0.8 | −0.2 | 2.7 | 1.7 |

It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

The invention claimed is:

1. A corrosion-inhibited antifreeze concentrate composition which inhibits general, pitting, crevice, and deposit-attack corrosion in the cooling system of a water-cooled internal combustion engine consisting essentially of:
   (a) from 90-99 weight percent of a water soluble liquid alcohol freezing point depressant;
   (b) from 0.1-5.0 weight percent of an alkylbenzoic acid or the alkali metal, ammonium, or amine salt thereof, said acid having the general formula

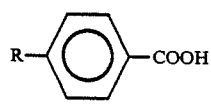

where R is a $C_1$-$C_5$ alkyl radical;

(c) from 0.1-5.0 weight percent of a $C_8$-$C_{12}$ aliphatic monobasic acid or the alkali metal, ammonium, or amine salt thereof;
   (d) from 0.1-0.5 weight percent of a hydrocarbyl triazole; and
   (e) from 0-5.0 weight percent of a $C_8$-$C_{12}$ aliphatic dibasic acid or the alkali metal, ammonium, or amine salt thereof.

2. The corrosion-inhibited antifreeze concentrate composition of claim 1, where said liquid alcohol freezing point depressant is ethylene glycol.

3. The corrosion-inhibited antifreeze concentrate composition of claim 1, where said alkylbenzoic acid is 4-tert-butylbenzoic acid.

4. The corrosion-inhibited antifreeze concentrate composition of claim 1, where said $C_8$-$C_{12}$ aliphatic monobasic acid is selected from the group consisting of octanoic acid, nonanoic acid, decanoic acid, undecanoic acid, dodecanoic acid, 2-ethylhexanoic acid, and neodecanoic acid.

5. The corrosion-inhibited antifreeze concentrate composition of claim 4, where said $C_8$-$C_{12}$ aliphatic monobasic acid is octanoic acid.

6. The corrosion-inhibited antifreeze concentrate composition of claim 4, where said $C_8$-$C_{12}$ aliphatic monobasic acid is 2-ethylhexanoic acid.

7. The corrosion-inhibited antifreeze concentrate composition of claim 1, where said hydrocarbyl triazole is tolyltriazole or benzotriazole, present in a concentration of 0.1-0.3 weight percent.

8. The corrosion-inhibited antifreeze concentrate composition of claim 1, where said $C_8$-$C_{12}$ aliphatic dibasic acid is selected from the group consisting of: suberic acid, azelaic acid, sebacic acid, undecanedioic acid, dodecanedioic acid, and the diacid of dicyclopentadiene.

9. The corrosion-inhibited antifreeze concentrate composition of claim 8, where said $C_8$-$C_{12}$ aliphatic dibasic acid is sebacic acid, present in a concentration of 0.1-5.0 weight percent.

10. The corrosion-inhibited antifreeze concentrate composition of claim 1, in which an additional corrosion inhibitor selected from the group consisting of alkali metal borates, alkali metal silicates, alkali metal benzoates, alkali metal nitrates, alkali metal nitrites, alkali metal molybdates, and hydrocarbyl thiazoles is also employed at a concentration of 0.01-5.0 weight percent.

11. The corrosion-inhibited antifreeze concentrate composition of any of claims 1-7 and 8-10, where said antifreeze composition is diluted with from 10-90 volume percent of water.

12. The corrosion-inhibited antifreeze concentrate composition of any of claims 1-7 and 8-10, where said antifreeze composition is diluted with from 25-75 volume percent of water.

13. A process for inhibiting the general, pitting, crevice and deposit-attack corrosion of metals present in the cooling system of an internal combustion engine which comprises intimately contacting the metal surface to be inhibited against corrosion with the corrosion-inhibited antifreeze concentrate composition of claim 1.

14. A process for inhibiting the general, pitting, crevice and deposit-attack corrosion of metals present in the cooling system of an internal combustion engine which comprises intimately contacting the metal surface to be inhibited against corrosion with the corrosion-inhibited aqueous antifreeze composition of claim 12.

* * * * *